3,192,287
POLYESTER URETHANE MATERIAL SUITABLE AS A VEHICLE FOR PRINTING INKS FOR REGENERATED CELLULOSE SUBSTRATES
Victor J. Pelzek, Milwaukee, and Adolph Miller, Fox Point, Wis., assignors to Milprint, Inc., Milwaukee, Wis., a corporation of Delaware
No Drawing. Filed Aug. 2, 1961, Ser. No. 128,661
3 Claims. (Cl. 260—858)

This invention relates to printing inks; more particularly, it relates to ink vehicles and ink formulations which will adhere to regenerated cellulose substrates and which will exhibit a high degree of moisture-resistance and flexibility.

A printing ink may be thought of as essentially a two component system comprising a vehicle and a dispersed pigment; other agents such as dispersing agents; adhesion promoters, film hardeners or plasticizers may be added to control or modify various properties of the basic system. The vehicle used in a printing ink generally acts as a binder and film former while the pigment, which may be a single compound or a mixture, provides the color. The nature of the vehicle component of a printing ink will determine the adhesive properties of the ink, thereby establishing the substrate materials to which a particular ink system may be applied.

It has been found that ordinary printing inks used in rotogravure or flexographic printing processes do not adhere to uncoated regenerated cellulose, such as film designated as "PD" cellophane by the Du Pont Chemical Company or "PT" cellophane by the Olin Mathiesen Chemical Corp., when the printed film is subjected to high humidity ambient conditions or is wet with water. Under these conditions, the known rotogravure printing ink compositions will tend to "lift" from the printed uncoated cellophane surface. A further disadvantage of such known printing inks is that they are relatively inflexible and thus shrinking of the printed substrate will generally result in "lifting" of the printing ink. This lack of a suitable rotogravure printing ink has inhibited the use of printed uncoated cellophane film materials for packaging articles which are subjected to high moisture conditions and as a shrinkable wrapper wherein the wrapper is expanded by wetting and then wrapped around the commodity so as to tightly conform to the outline thereof upon drying and shrinking.

Accordingly, one of the principal objects of this invention is to provide printing inks which will adhere to uncoated regenerated cellulose under high moisture conditions and which will withstand immersion in water without serious lifting of the ink. Another object of this invention is to provide printing inks for uncoated cellophane films which will be flexible enough to maintain a good printed image even after the cellophane film has been shrunk. These objects, together with others which will become apparent from the following description, are accomplished through the provision of improved vehicles for printing inks for regenerated cellulose comprising a mixture of certain polyesters and urethanes. Printing inks may be formulated from these improved vehicles by incorporating therewith suitable pigments and, if desired, other ingredients to provide desired film or flow characteristics. Printing inks embodying this invention are particularly useful for application by rotogravure printing processes.

We have discovered that a vehicle for use in compounding printing inks of greatly improved wet adhesion can be provided by a mixture of saturated polyesters with a low ratio of hydroxyl to methylene groups and urethane compounds with at least one, and preferably two or three, available isocyanate groups per molecule. The improved adhesive properties of the ink vehicles of this invention are provided by chemical linkages formed between the available isocyanate groups of the urethane component of the vehicle with the hydroxyl groups present on the cellulose surface. However, this linkage is formed only when the polyester component of the vehicle has a hydroxyl content below a certain critical limit, specifically a ratio of hydroxyl to methylene group of about 0.2 or less and preferably 0.15 or less. When the ink vehicles of this invention are used in formulating printing inks which are dissolved in suitable solvents and applied to cellulose surfaces, two competing reactions begin upon evaporation of the solvent: (a) the reaction between the isocyanate groups of the urethane component of the vehicle and the hydroxyl groups of the polyester component of the vehicle, and (b) the reaction between the isocyanate group of the urethane component of the vehicle and the hydroxyl groups of the cellulose surface. We have found that reaction (b) is favored only when the polyester component has a low hydroxyl content within the above critical limits and that a strong bond between the ink and the cellulose is thereby developed. When the hydroxyl content of the polyester is above this critical limit, however, reaction (a) is favored and there are insufficient isocyanate groups available for developing a strong bond between the ink and cellulose.

The polyesters useful in the ink vehicles of this invention comprise linear saturated polyesters which are the condensation reaction product of saturated polyhydric alcohols and saturated dibasic acids ( or acid anhydrides) with a hydroxyl group:methylene group ratio ($OH/CH_2$) of about 0.20 or less and preferably about 0.15 or less. The $OH/CH_2$ ratio of any particular polyester may be quantatively measured by infra-red spectra analysis; techniques and data for such analysis may be obtained by reference to Infra-red Spectra of Complex Molecules, L. J. Bellamy, Mathuen and Co. Ltd., 2d Ed., 1958, and Encyclopedia of Spectroscopy, G. L. Clark, Editor, Reinhold, 1960. A typical polyester of this type is that formed by the reaction of ethylene glycol and terephthalic acid with the relative proportions of the reactants selected to provide a hydroxyl group:methylene group ratio of about 0.081. Other saturated polyhydric alcohols may be used, including but not limited to: aliphatic glycols other than ethylene glycol, trihydroxy alcohols such as glycerol, pentaerythritol, and substituted compounds of the foregoing. Other saturated dibasic acids may also be used, including but not limited to: adipic, azelaic, sebacic, other isomers of phthalic acid, and anhydrides and substituted compounds of the foregoing. Polyesters suitable for practice of this invention are generally viscous liquids or rubbery solids of high molecular weight.

Urethanes useful in the ink vehicles of this invention comprise the reaction products of saturated diisocyanate with a saturated polyol, the reaction product having at least one isocyanate group per molecule, and preferably two or three, available for bonding with cellulose surface. A typical urethane is the formed by the reaction of tolylene diisocyanate and trimethylol propane, which urethane has the following structure:

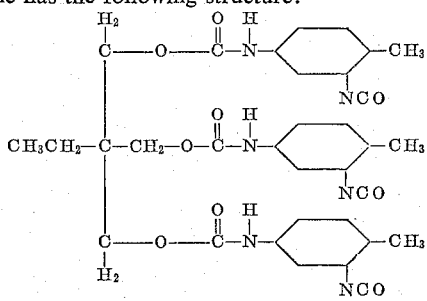

The relative quantities of the two reactants are selected to yield a urethane with a negligible number of unreacted hydroxyl groups and the three available isocyanate groups. The above compound includes a so-called urethane linkage

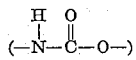

and the term "urethane" as used in this description and the appendant claims is defined as the reaction product of a polyol and a diisocyanate containing the foregoing urethane linkage joining the organic radicals obtained from the two reactants. As was true with the polyester component, a large number of saturated polyols are available to produce a urethane including glycols, polyesters, polyethers, castor oil and the like. Trimethyol propane and its derivatives are preferred because the reaction between its active hydrogens and isocyanate group is more readily controllable. As for the diisocyanate, tolylene diisocyanate is the most widely available, generally as a mixture of about 80% of the 2,4 isomer and about 20% of the 2,6 isomer but also as a mixture of about 65% of the 2,4 isomer and about 35% of the 2,6; diphenyl methane 4,4'-diisocyanate and other saturated diisocyanates may also be used.

This invention will be more fully understood by reference to the following examples in which "parts" refers to parts by weight unless otherwise indicated. It is pointed out, however, that the examples are given for the purposes of illustration only and are not to be construed as limiting the scope of the present invention. In Example 1, the polyester component of the vehicle was the reaction product of ethylene glycol and terephthalic acid with a $OH/CH_2$ ratio of 0.081; the polyesters used in Examples 2 through 5 were saturated linear polyesters with a higher $OH/CH_2$ ratio as specified hereinafter. The urethane component of the vehicles used in Examples 1 through 5 was the reaction product of tolylene diisocyanate and trimethylol propane, with the structure described above.

EXAMPLE 1

A printing ink of the following composition was prepared by dissolving the resin solids in toluol, adding the pigment to the lacquer bases and ball-milling the pigments into the clear bases to obtain a good dispersion:

| | Parts |
|---|---|
| Vehicle: | |
|    Polyester, $OH/CH_2=0.081$ | 16.2 |
|    Urethane | 6.5 |
| Pigment: | |
|    Watchung red | 15.5 |
| Other ingredients: | |
|    Dimerized fatty acid resin | 5.0 |
|    Methyl ester of hydrogenated rosin | 2.0 |
|    Ethyl acetate | 1.0 |
| Solvent: | |
|    Toluol | 53.8 |
| | 100.0 |

The ink was applied to a web of "PD" cellophane using a standard rotogravure printing technique. After the ink was thoroughly dried to evaporate the solvent, it was tested for wet adhesion in the manner described below.

EXAMPLES 2–5

In these examples, printing inks were prepared which had the same composition as that of Example 1 except that the polyester component of the vehicle consisted of saturated linear polyesters with a higher $OH/CH_2$ ratio than that of Example 1. The $OH/CH_2$ ratio of the polyesters used in these examples were as follows:

*Table I*

| Example: | $OH/CH_2$ ratio |
|---|---|
| 2 | 0.545 |
| 3 | 0.388 |
| 4 | 0.244 |
| 5 | 0.26 |

The inks of Examples 2–5 were prepared and applied to a web of "PD" cellophane using the same procedures described under Example 1 and their wet adhesion determined as described below. The polyesters used in the inks of Examples 2–5 were saturated polyesters of a dibasic acid and a glycol; their $OH/CH_2$ ratio was measured by infrared analysis as referred to above, although their specific chemical composition was not available due to their proprietary nature. The polyesters used in these examples have high $OH/CH_2$ ratios which are outside the scope of the present invention and the wet adhesion of the inks containing them is compared below to that of the ink of Example 1 which contains a polyester having an $OH/CH_2$ ratio within the present invention.

WET ADHESION TESTING

Samples were cut from the printed webs of Examples 1 through 5 and soaked in lukewarm water (120° F.). The wet adhesion of each ink was determined by measuring (a) the time required for the ink to lift from the soaked sample without mechanical abrasion, and (b) the degree to which the ink could be lifted from the soaked sample under mechanical abrasion applied by vigorously rubbing the ink by hand and scratching it with a fingernail. The inks of Examples 2 through 5 all lifted from the cellophane surface after only 30 minutes' immersion in the lukewarm water; by comparison, the ink of Example 1 showed no lifting after being immersed for 6 hours. The inks of Examples 2 through 5 all were readily removed from the cellophane surface under hand abrasive action after only 15 minutes' immersion in the lukewarm water; by comparison, the ink of Example 1 showed no tendency to lift under hand abrasive action after 6 hours' immersion. The experimental data clearly emphasize the vastly improved wet adhesion to regenerated cellulose of printing inks which include a vehicle formulated in accordance with this invention. In addition, the ink of Example 1 was flexible enough to provide a good, undistorted printed image even after the printed substrate had dried and shrunk; none of the inks of Examples 2–5 provided this feature.

EXAMPLE 6

The printing ink vehicles of this invention may also be compounded with metallic pigments to provide printing inks of improved wet adhesion. An ink of the following composition was prepared and applied to a web of "PD" cellophane using the procedures described above under Example 1:

| | Parts |
|---|---|
| Vehicle: | |
|    Polyester, same as Ex. 1, $OH/CH_2=0.081$ | 16.5 |
|    Urethane | 3.75 |
| Pigment: | |
|    Aluminum powder | 40.0 |
| Other ingredients: | |
|    Ethyl acetate | 1.25 |
| Solvent: | |
|    Toluol | 38.5 |
| | 100.0 |

The wet adhesion of the ink of Example 6 was tested as described above and, as was the case with the ink of Example 1, the ink showed no tendency to lift after six hours immersion in lukewarm water, did not lift under hand mechanical abrasion, and was flexible enough to provide a good printed image after shrinking of the printed substrate.

A wide variety of metallic and non-metallic pigments may be compounded with the ink vehicles of this invention and those skilled in the art will be readily able to devise substitutes for the specific pigments listed in the above examples. In general, when a non-metallic pigment is used, it is preferable to incorporate a dispersing agent and adhesion promoter in the formulation. The relative quantity of pigment compounded with the vehicles may also be varied over a wide range and the specific amount selected with due regard to the opacity desired and adhesive properties of the ink. About 25–45% metallic pigment and about 10–25% non-metallic pigment appear to be the preferable pigment ranges for use with the ink vehicles of this invention. Although toluol is shown as the solvent in the foregoing examples, a wide variety of commonly used organic solvents may also be substituted, such as hydrocarbons, chlorinated aromatics, methyl ethyl ketone and the like. As was true with the type and amount of pigment used, those skilled in the ink formulation art will be readily able to select suitable dispersing agents and adhesion promoters, and relative quantities thereof, quantity of pigment and type of solvent suitable for the practice of this invention. The preferred application of printing inks incorporating this invention is by the rotogravure printing process; their use with the flexographic process is dependent upon the effect of the solvent used for the ink on the rubber rollers now used in the flexographic process.

The quantity of vehicle used in any particular ink formulation and the ratio of the urethane component to the polyester component in the vehicle may also vary over a wide range. In general, the vehicle may comprise about 20–65% by weight of the ink and the urethane is preferably present in amounts equal to about 20–50% of the weight of the polyester component in order to maintain flexibility of the dried ink.

We claim:
1. A composition of matter suitable for use as a vehicle for printing inks for application to regenerated cellulose substrates, comprising a solvent solution of (1) a saturated linear polyester having a ratio of hydroxyl groups to methylene groups of not more than about 0.20; said polyester comprising the reaction product of (i) a polyhydric alcohol selected from the group consisting of ethylene glycol, glycerol and pentaerythritol, with (ii) a saturated dibasic acid selected from the group consisting of adipic acid, azelaic acid, sebacic acid, phthalic acid, and anhydrides of the foregoing acids; and (2) a urethane having at least one available isocyanate group per molecule, said urethane comprising the reaction product of (i) a saturated diisocyanate selected from the group consisting of tolylene diisocyanate and diphenyl 4,4'-disocyanate, with (ii) trimethylol propane;
   the amount of polyester in said composition comprising, on a weight basis, at least twice the amount of urethane therein;
   said composition further characterized in that when applied as a thin layer to a regenerated cellulose substrate some of said available isocyanate groups will form chemical linkages with the substrate upon the evaporation of the solvent.

2. A composition of matter suitable for use as a vehicle for printing inks for application to regenerated cellulose substrates, comprising a solvent solution of (1) a saturated linear polyester having a ratio of hydroxyl groups to methylene groups of not more than about 0.20; said polyester comprising the reaction product of ethylene glycol with terephthalic acid, and (2) a urethane having at least one available isocyanate group per molecule, said urethane comprising the reaction product of tolylene diisocyanate with trimethylol propane;
   the amount of polyester in said composition comprising, on a weight basis, at least twice the amount of urethane therein;
   said composition further characterized in that when applied as a thin layer to a regenerated cellulose substrate some of said available isocyanate groups will form chemical linkages with the substrate upon evaporation of the solvent.

3. A composition of matter according to claim 2 wherein the polyester has a ratio of hydroxyl groups to methylene groups of not more than about 0.09.

References Cited by the Examiner
UNITED STATES PATENTS

| | | | |
|---|---|---|---|
| 2,861,972 | 11/58 | Muller | 260—45.4 |
| 2,912,408 | 11/59 | Nischk | 260—45.4 |
| 2,962,470 | 11/60 | Jung | 260—45.4 |
| 3,001,971 | 9/61 | Scott | 260—45.7 |

LEON J. BERCOVITZ, *Primary Examiner.*

HAROLD N. BURNSTEIN, *Examiner.*